United States Patent
Biermann et al.

(10) Patent No.: US 9,169,917 B2
(45) Date of Patent: Oct. 27, 2015

(54) SUPPORT STRUCTURE OF A PLANET GEAR CARRIER

(71) Applicant: Schaeffler Technologies AG & Co. KG, Herzogenaurach (DE)

(72) Inventors: Thorsten Biermann, Wachenroth (DE); Harald Martini, Herzogenaurach (DE); Richard Grabenbauer, Kastl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 250 days.

(21) Appl. No.: 13/848,193

(22) Filed: Mar. 21, 2013

(65) Prior Publication Data

US 2014/0243141 A1    Aug. 28, 2014

(30) Foreign Application Priority Data

Mar. 20, 2012   (DE) .................. 10 2012 204 354

(51) Int. Cl.
  *F16H 57/08*   (2006.01)

(52) U.S. Cl.
  CPC .............. *F16H 57/082* (2013.01); *F16H 57/08* (2013.01)

(58) Field of Classification Search
  CPC ............................. F16H 57/082; F16H 57/08
  USPC .................................................. 475/331, 159
  See application file for complete search history.

(56) References Cited

U.S. PATENT DOCUMENTS

| 3,375,735 | A | 4/1968 | Saari | |
|---|---|---|---|---|
| 8,550,957 | B2 * | 10/2013 | Erno et al. | 475/347 |
| 2003/0181284 | A1 * | 9/2003 | Chen | 475/331 |
| 2005/0026744 | A1 * | 2/2005 | Illerhaus | 475/331 |
| 2006/0154778 | A1 * | 7/2006 | Sowul et al. | 475/331 |
| 2010/0139425 | A1 * | 6/2010 | Schulz et al. | 74/63 |
| 2012/0028756 | A1 * | 2/2012 | Lopez et al. | 475/346 |

FOREIGN PATENT DOCUMENTS

| DE | 1650737 | | 9/1971 |
|---|---|---|---|
| DE | 4421931 | | 1/1996 |
| DE | 10129418 | | 5/2002 |
| DE | 10203880 | | 4/2003 |
| DE | 102011003706 | A1 * | 8/2012 |
| DE | 102012208796 | A1 * | 11/2013 |
| EP | 0271416 | A1 * | 6/1988 |
| EP | 1703174 | A1 * | 9/2006 |
| EP | 2484934 | A1 * | 8/2012 |
| WO | 2009013065 | | 1/2009 |

* cited by examiner

Primary Examiner — Roger Pang
(74) Attorney, Agent, or Firm — Simpson & Simpson, PLLC

(57) ABSTRACT

A planet gear carrier (1) for an automotive vehicle having a plurality of mounting regions (2), mounting a respective planet gear (4), and between the mounting regions (2), at least one aperture (5) such as a through-hole (6) that weakens the planet gear carrier (1), and when filled by a stiffening element (7) reinforces the planet gear carrier (1). A planet gear carrier having installed planet gears, a spur gear differential comprising such a planet gear carrier as well as a spur gear differential comprising two planet gear carriers of the aforesaid type.

10 Claims, 5 Drawing Sheets

SUPPORT STRUCTURE OF A PLANET GEAR CARRIER

FIELD OF THE INVENTION

The invention relates to a planet gear carrier for an automotive vehicle.

BACKGROUND OF THE INVENTION

Carrier arrangements are basically already known from DE 101 29 418 A1. This publication discloses a laminated carrier comprising a first end plate, a second end plate and a connection, the first and second end plates being connected to each other so that windows are formed between said plates for the arrangement of planet gears. At least one of the first and the second plates comprises a plurality of material layers that are connected to one another such that a non-uniform internal structure is formed. The carrier arrangement shown in DE 101 29 418 A1 comprises planet gears that are mounted through planet shafts.

A further carrier arrangement known from DE10203880 A1 is made up of two carrier parts, planet gears and webs. The planet gears are arranged between the carrier parts. The webs connect the carrier parts to each other. For this purpose, the ends of the webs are inserted and calked into apertures of the carrier parts.

However, planet gear carrier plates are also known that transfer torques to the planet gears that are mounted via the tip circle, i.e., as "centerless" or loose planet gears on the planet gear carrier plate.

Thus, WO 2009/013065 A2 discloses a planetary differential transmission comprising a driving spur gear comprising an outer gearing and, connected rotationally fast to this, a planet gear carrier arranged in the hub region of the driving spur gear. Said planet gear carrier carries at least one pair of meshing planet gearwheels, each of the at least two planet gearwheels being in meshing engagement with a respective sun gear that is connected rotationally fast to a driven shaft and comprises an outer gearing. The planetary differential transmission includes at least one heterodyne step that comprises at least one idler pinion that is in meshing engagement with one of the driven shafts and in meshing engagement with an annulus that is coupled rotationally fast to the driving spur gear. The at least one heterodyne step further comprises at least one controllable clutch for a variable deceleration of the at least one idler pinion relative to a housing section and/or relative to the at least one driven shaft, or comprises a controllable clutch for a variable deceleration or acceleration of the annulus relative to the driving spur gear.

DE 1 650 737 further discloses self-locking differential transmissions comprising spur gears. In the self-locking differential transmissions comprising spur gears disclosed in this document, a number of first planet gears are arranged in a first planet orbit and mesh with one of the two sun gears, and a number of second planet gears are arranged in a second planet orbit and mesh with the other of the two sun gears, one of the first planet gears meshes with at least one of the second planet gears, and all planet gears are supported through a friction mounting in the planet gear carrier through their tooth heads, at least one spring ring exerting an all-around radial compressive force on the planet gears for obtaining an additional radial force between the planet gears and their mounting surfaces in the planet gear carrier.

A differential arrangement is also known from U.S. Pat. No. 3,738,192. In this arrangement, individual planet gears are loosely mounted between two plates within a spur gear and are alternatingly in meshing engagement with each other.

However, the existing and known planet gear carriers generally have the drawback that they are particularly heavy.

A planet carrier that is made up of two carrier parts, webs between the carrier parts and planet gears between the webs is shown in U.S. 2003/0181284 A1. Both the carrier parts as well as the webs that connect the carrier parts to each other have a solid structure.

Efforts have been made to improve this situation by providing apertures so that light weight planet gear carriers are created. However, such light weight planet gear carriers have the drawback of not being particularly stable or torsion resistant under extreme types of loading.

A known solution that is supposed to eliminate this drawback is described in DE 44 21 931 A1. DE 44 21 931 A1 describes a planet gear carrier made up of two carrier parts. The carrier parts are connected to each other through axially oriented webs that extend between mounting regions for the planet gears. As a stiffening element for the planet carrier, the webs have such a solid configuration that they fully occupy the maximum empty space available between the planets. One of the carrier parts comprises apertures into each of which one of the webs is inserted with an interference fit with the result that the apertures which otherwise weaken the carrier part are filled by the stiffening element.

BRIEF SUMMARY OF THE INVENTION

In this respect, the invention intends to provide an improvement. It is therefore an object of the present invention to provide a light weight planet gear carrier that, at the same time, is reinforced, i.e., has a stiffened configuration.

The invention relates to a planet gear carrier for an automotive vehicle having a plurality of mounting regions, each mounting region mounting a respective planet gear, and further having between the mounting regions at least one aperture such as a through-hole that weakens the planet gear carrier.

The invention achieves the above object by the fact that the aperture is defined by a section of a collar that is configured as an integral component of the planet gear carrier and forms a part of the mounting region. This enables the transmission of higher forces.

An embodiment of the invention is also described wherein the aperture is defined on two sides by a respective collar of two mounting regions. The region of the planet gear carrier situated between two mounting regions can thus be completely freed of material of the planet gear carrier during creation of the through-hole, and a supporting and reinforcing effect of the stiffening element can be utilized after assembly of the stiffening element. The collar can also serve as a side guide wall for planet gears and can also be designated in short as a side wall.

A further advantage thus obtained is that the apertures are concealed. A sealing of the apertures, for instance against entry and exit of mediums is thus achieved. Lubricant can no longer exit from the interior of a differential that uses such a planet gear carrier and impurities can no longer penetrate into the interior. The stiffening elements inserted into the apertures can be made by punching, bending, stamping or even by forging or extrusion molding.

According to one advantageous feature, each mounting region is designed so as to engage at least partially around the respective planet gear in sections. In this way, the planet gears can be mounted at the tip circle, i.e., centerless. The stiffening elements are worked into the empty spaces of the stamped planet gear carrier, for example of a planet gear carrier plate, and serve as supports and to prevent twisting from occurring or acting on the planet gear carrier.

According to a further advantageous feature, a center of the aperture has a same radial distance from the center of the planet gear carrier as a distance of an axis of rotation of a planet from the center of the planet gear carrier through which an axis of rotation of the planet gear carrier extends. During rotation of the planet gear carrier, a uniform distribution of forces is thus guaranteed.

It is particularly advantageous if the collar is preferably configured as a section of the planet gear carrier bent almost at a right angle to the surface of the planet gear carrier. This assures a uniform contact with the planet gear so that only sight noises and only slight wear occur.

Assembly can be simplified if the stiffening element is prefabricated. The sealing action is improved if the stiffening element is adapted in shape to the through-hole.

It is further particularly advantageous if the stiffening element comprises on two opposing surfaces a concave shape, and/or on two opposing surfaces a convex surface and a concave surface respectively, the convex surface being preferably situated on a side of the stiffening element facing away from the center of the planet gear carrier. This enables a particularly good distribution of forces.

In order to avoid a foaming of the lubricating fluid in the region of the planet gears, or at least to reduce the flow resistance in this region, it is advantageous if the stiffening element extends exactly so far along the direction of the axis of rotation of the planet as the collar and corresponds to the contour of the collar. It is possible to use a plurality of stiffening elements, preferably 3 to 28, further preferably 7, 8 or 9 stiffening elements. In this case, the stiffening elements and the respective collars are arranged flush with one another on the side of the planet gear carrier facing the planet gears.

The flow resistance can further be reduced if the edge of the stiffening elements on the planet gear side of the stiffening element is slightly beveled, rounded or at least bent at an angle.

A further advantageous embodiment of the invention is described wherein the stiffening element is retained in the planet gear carrier by positive engagement and/or fusion of materials or force locking, preferably by pressing-in. A reverse bending of the collars is thus prevented.

If the stiffening element is fixed on the planet gear carrier by a snap connection, not only is a secured assembly realized but the permanent fixing of the stiffening element within the planet gear carrier is also improved.

It has proved to be particularly advantageous if the snap connection comprises a snap projection and a catch recess, the catch recess being configured in the collar and the snap projection being configured on the stiffening element. This arrangement can also be varied in that the catch recess is configured on the stiffening element and the snap projection is configured on the collar.

It is further advantageous if the stiffening element is made of the same material as the planet gear carrier or is made of a different material. By using die casting, particularly high strength values can be achieved. It is, however, also imaginable to use non-ferrous materials, ferrous materials and plastic materials. Among the non-ferrous materials, aluminum and other light weight metal alloys have proved to be advantageous, and as for manufacturing methods, sintering or injection molding have proved to be advantageous. Actually, if iron is used, recourse is generally had to steel alloys, and these are given their desired shape by die stamping and die casting. A large variety of plastic materials are basically suitable for being brought into a shaped desired of the stiffening element by molding and particularly by injection molding.

It is naturally an advantage to use not just one stiffening element but, as mentioned, a plurality of stiffening elements, namely so many as there are apertures in the planet gear carrier.

Finally, the invention also relates to a planet gear carrier with installed planet gears.

A special form of embodiment of the invention is also a spur gear differential comprising at least one planet gear carrier according to the invention as described above.

In such a spur gear differential, it is also advantageous to use two planet gear carriers of the invention, and it is further advantageous for the stiffening element to extend from one planet gear carrier to the other planet gear carrier. In this way, one and the same stiffening element can be used to completely fill a first aperture in the first planet gear carrier and at the same time also completely fill a second aperture in the second planet gear carrier. The design space between the two planet gear carriers and the lubricant oil required are thus reduced and the number of stiffening elements to be installed is likewise reduced while the assembly is simplified. Through this measure, costs can be further reduced.

BRIEF DESCRIPTION OF THE SEVERAL VIEWS OF THE DRAWING

The nature and mode of operation of the present invention will now be more fully described in the following detailed description of the invention taken with the accompanying drawing figures, in which.

DETAILED DESCRIPTION OF THE INVENTION

Figure 1:
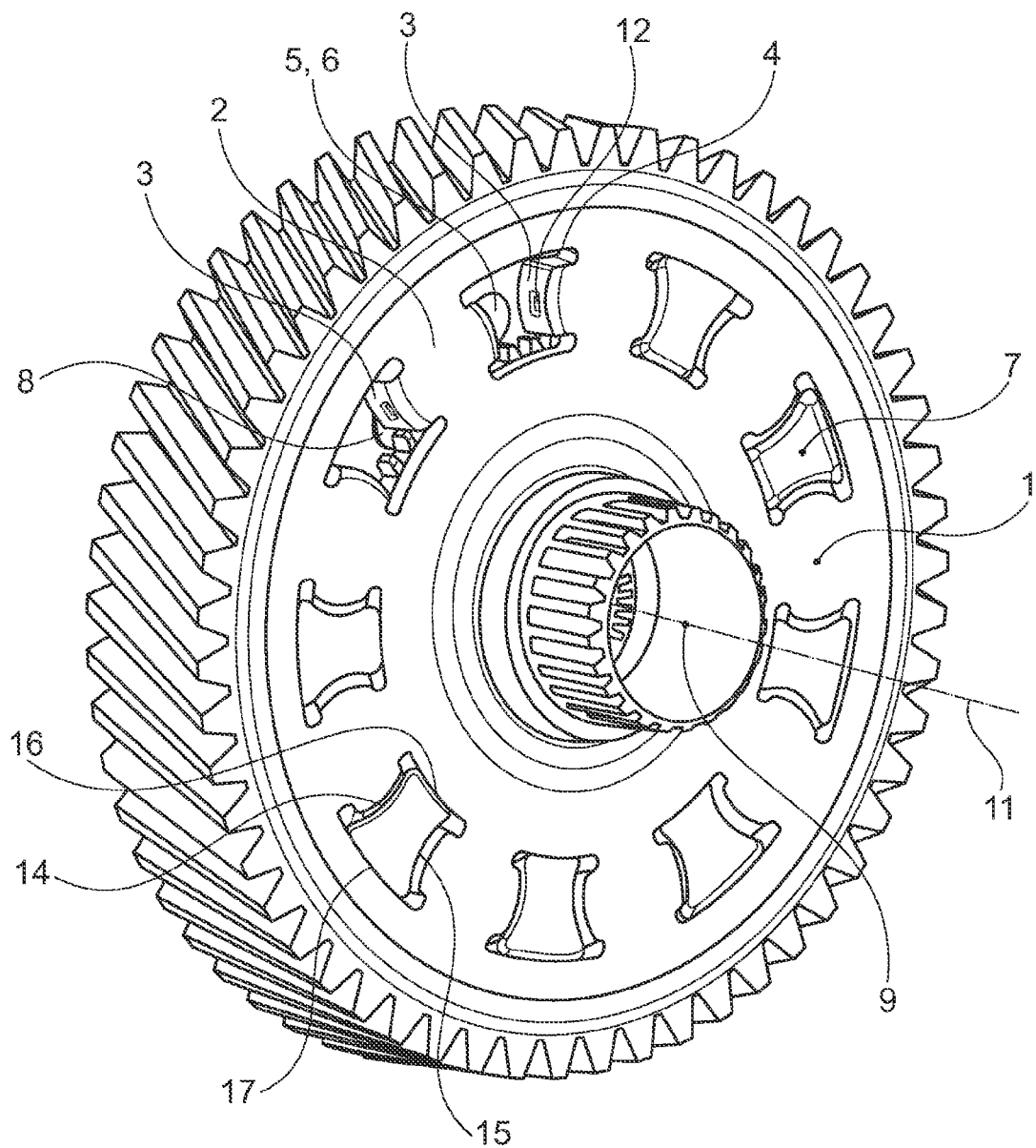
FIG. 1 is a perspective representation of an installed planet gear carrier comprising apertures that are partially closed by stiffening elements.

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

The figures are merely of a schematic nature and serve only for an understanding of the invention. Identical elements are identified at identical reference numerals.

FIG. 1 shows an embodiment of planet gear carrier 1 of the invention. Planet gear carrier 1 can also be designated as a planet carrier exactly as it can also be called a planet carrier plate because it is made out of a metallic material, particularly iron-containing material such as steel, particularly sheet steel.

Planet gear carrier 1 is made by punching, drawing and stamping. Planet gear carrier 1 is used in an automotive material such as a passenger car or a truck.

Figure 4:
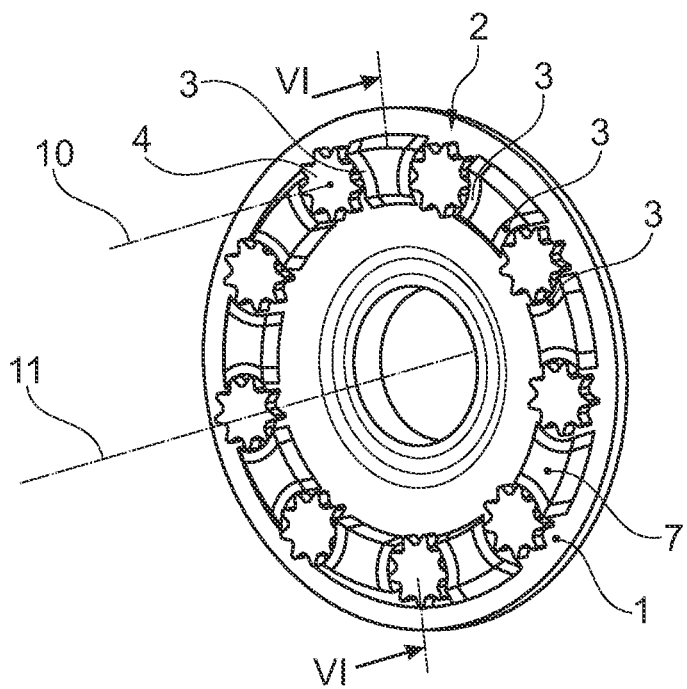
FIG. 4 is a rear view from the side on which the planet gears are arranged, in a slightly perspective representation.
Figure 6:
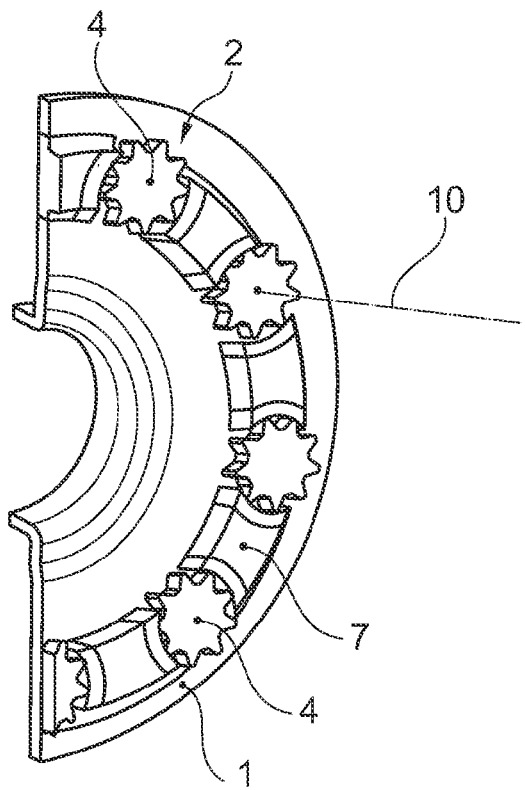
FIG. 6 is a section through the planet gear carrier of FIG. 4 taken along line VI; and, FIG. 7 is a further cross-sectional representation through the planet gear carrier that can also be designated as a planet carrier, but in a mirrored view relative to FIG. 6.

Plurality of mounting regions 2, also to be seen in FIGS. 4 and 6, are configured on planet gear carrier 1. Mounting regions 2 are particularly defined by opposing collars 3. Collars 3 are integral components of planet gear carrier 1 and project at a right angle from the surface of planet gear carrier 1 towards planet gears 4. Mounting regions 2 and particularly collars 3 engage at least section-wise around a respective one of planet gears 4. Each planet gear 4 is thus adjoined on two sides by respective collar 3. Collar 3 thus substantially follows the outer contour of planet gear 4. Apertures 5 configured as through-holes 6 are arranged between mounting regions 2.

In FIG. 1, seven of nine apertures 5 are closed, each one by respective stiffening element 7.

Stiffening elements 7 are inserted into planet gear carrier 1 to be flush with the surface of planet gear carrier 1 turned away from planet gears 4.

Figure 7:
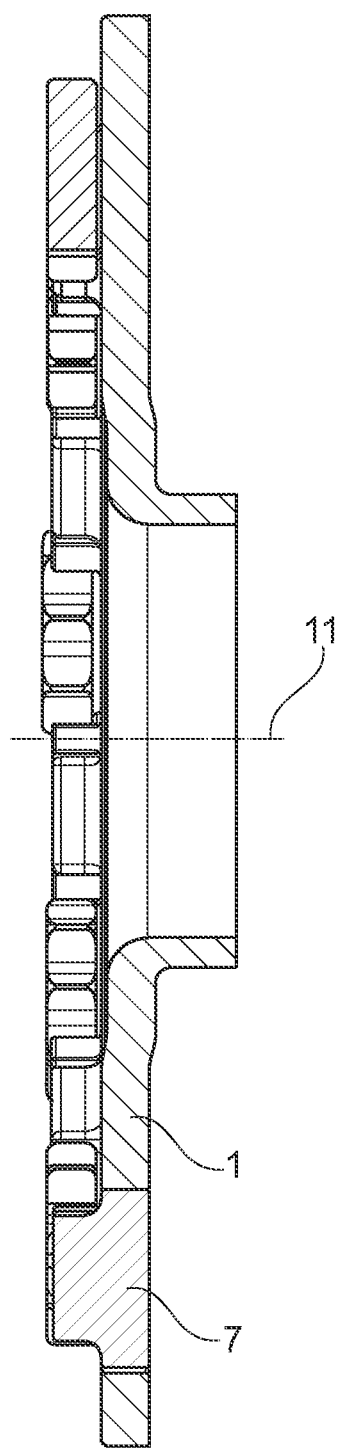

As best seen in FIGS. 4, 6 and 7, stiffening elements 7 on the side of planet gear carrier 1 facing the planet gears are oriented flush with the ends of collars 3.

As can be clearly seen in FIGS. 1, 2 and 4 to 6, center 8 of each of apertures 5 is situated at the same radial distance from center 9 of planet gear carrier 1 as the distance of an axis of rotation 10 of a planet from center 9 of planet gear carrier 1, through which center 9 the axis of rotation 11 of planet gear carrier 1 also extends.

Figure 3:
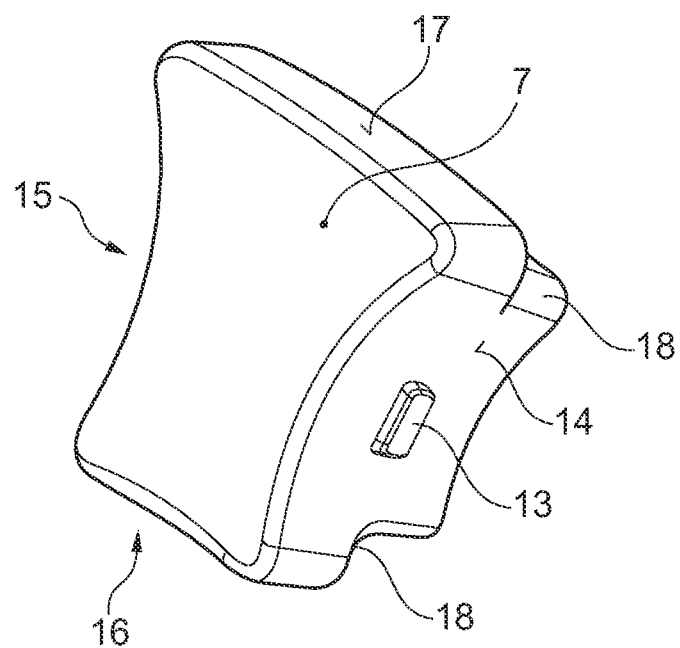
FIG. 3 is a single stiffening element in a perspective representation.

Aperture 5 is thus defined on two sides by respective collar 3 of two mounting regions 2. Each collar 3 comprises catch recess 12 into which snap projection 13, which can also be designated as a snap nipple, snaps to thus form a snap connection. Snap projection 13 is arranged on concave side 14 of stiffening element 7. On the opposite side, stiffening element 7 comprises concave side 15 and further also comprises third concave side 16 that connects sides 14 and 15 to each other. Only the side situated opposite third concave side 16 has a convex configuration and is identified at 17. It is further also possible to configure stiffening element 7 with prismatic or polygonal shapes. Additionally, as shown in FIG. 3, it is also possible to provide indentations 18 that minimize the flow resistance in the installed state. Concave and convex sides 14 to 17 can also be designated as concave or convex surfaces.

The fact that planet gears 4 alternate with stiffening elements 7 in circumferential direction is to be seen particularly clearly in FIGS. 4 and 6.

Figure 5:
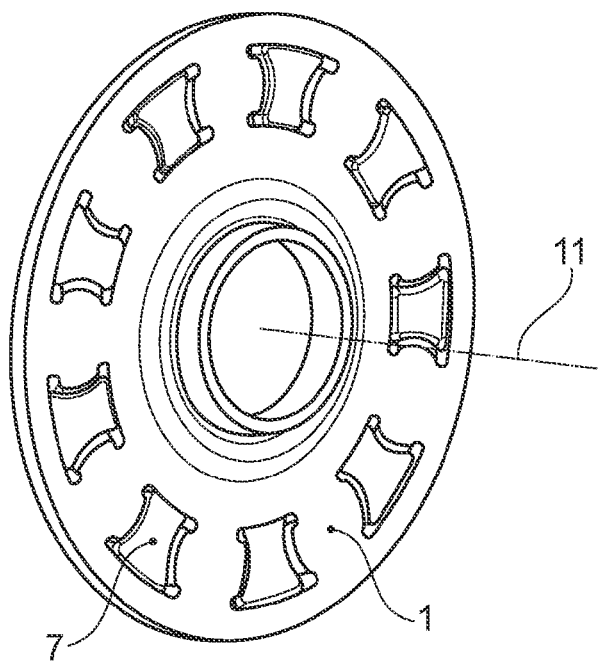
FIG. 5 is a representation of only the planet gear carrier of FIG. 1 comprising stiffening elements inserted at all points.

In the installed state shown in FIG. 5, it can be clearly seen that, after assembly of stiffening element 7, a completely or almost completely closed surface is realized on planet gear carrier 1 in order to restore the desired leak-proof property.

Figure 2:
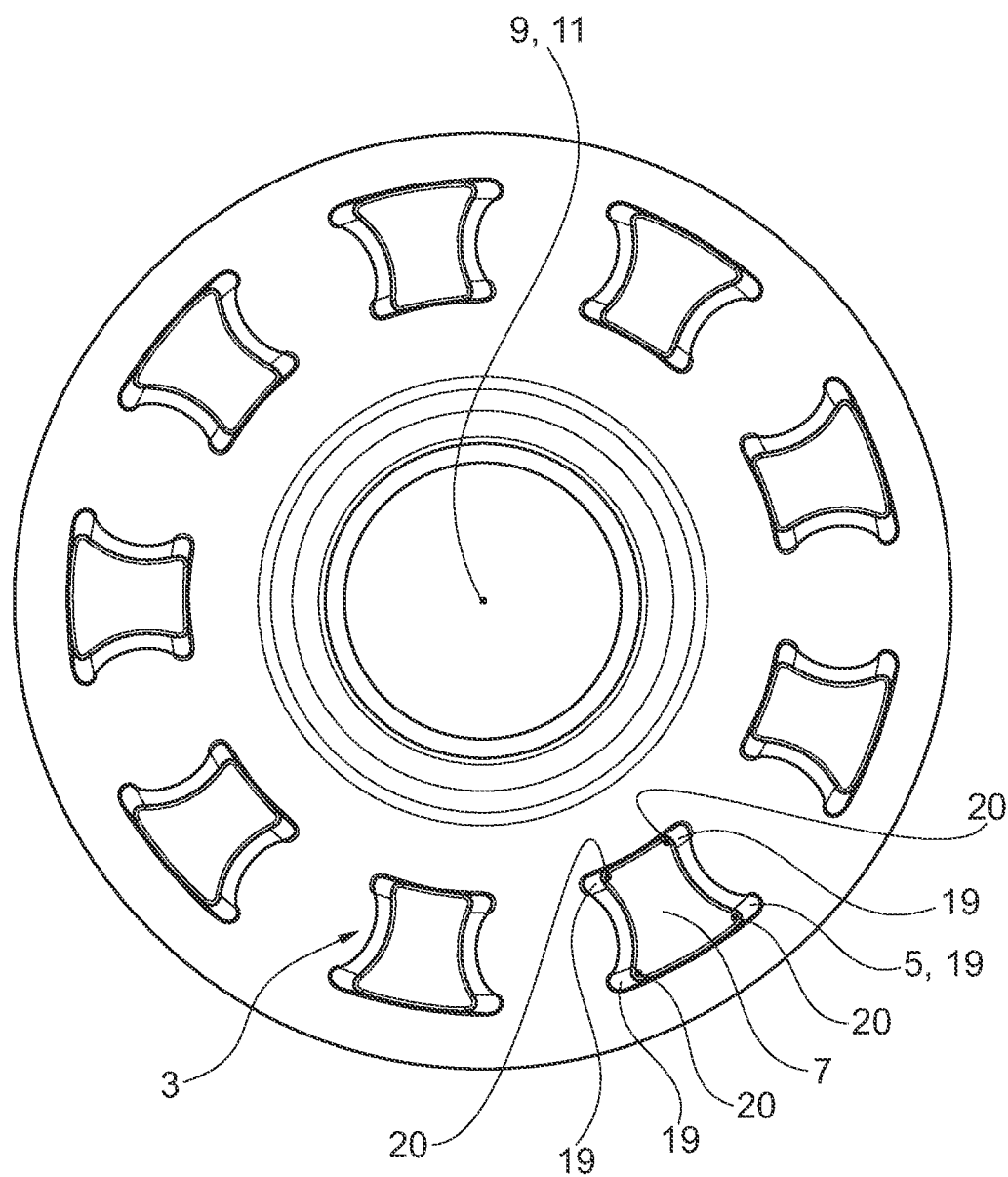
FIG. 2 is a front view on a planet gear carrier of the invention comprising inserted stiffening elements.

The symmetric arrangement of the individual elements of planet gear carrier 1 with installed stiffening elements 7 can best be seen in FIG. 2. In the initial example shown in this figure, a very small region of aperture 5, namely slit 19 on four rounded corners 20 of stiffening element 7 is still unclosed. It is, however, possible to adapt the outer shape of stiffening element 7 appropriately and thus close aperture 6 completely.

In addition or alternatively to the snap connection comprising catch recess 12 and snap projection 13, it is also possible, as shown in FIG. 7, to use an interference fit of stiffening element 7 in planet gear carrier 1.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

LIST OF REFERENCE NUMERALS

1 Planet gear carrier
2 Mounting region
3 Collar
4 Planet gear
5 Aperture
6 Through-hole
7 Stiffening element
8 Center of aperture
9 Center of planet gear carrier
10 Axis of rotation of a planet
11 Axis of rotation
12 Catch recess
13 Snap projection
14 Concave side
15 Concave side
16 Concave side
17 Convex side
18 Indentation
19 Slit
20 Corner

What we claim is:

1. A planet gear carrier (1) for an automotive vehicle, comprising:
   a plurality of mounting regions (2), each of said mounting regions (2) mounting a respective planet gear (4);
   at least one aperture (5):
      that weakens said planet gear carrier (1);
      including at least one collar (3) with at least one catch recess (12); and,
      arranged between said mounting regions (2) of said planet gear carrier (1) and,
   at least one stiffening element (7):
      including at least one snap projection (13); and,
      arranged to be inserted in said at least one aperture (5) such that said at least one snap projection (13) is inserted in said at least one catch recess (12) to fix on said planet gear carrier (1) through a snap connection,
   wherein said at least one aperture (5):
   is defined by a section of the at least one collar (3) that is configured as an integral component of said planet gear carrier (1); and,
   forms a part of said mounting region (2).

2. The planet gear carrier (1) recited in claim 1, wherein said plurality of mounting regions (2) are arranged to engage at least partially around said respective planet gear (4) in sections.

3. The planet gear carrier (1) recited in claim 1, wherein a center (8) of said at least one aperture (5) has a same radial distance from a center (9) of said planet gear carrier (1) as a distance of an axis of rotation (10) of a planet from said center (9) of said planet gear carrier (1) through which an axis of rotation (11) of said planet gear carrier (1) extends.

4. The planet gear carrier (1) recited in claim 1, wherein said at least one aperture (5) is defined on two sides by said at least one collar (3) of two mounting regions (2).

5. The planet gear carrier (1) recited in claim 1, wherein said at least one collar (3) is configured as a section of said planet gear carrier (1) bent approximately at a right angle to a surface of said planet gear carrier (1).

6. The planet gear carrier (1) recited in claim 1, wherein said at least one stiffening element (7) is adapted in shape to said at least one aperture (5).

7. The planet gear carrier (1) recited in claim 1, wherein said at least one stiffening element (7) is pre-fabricated.

8. The planet gear carrier (1) recited in claim 1, wherein said stiffening at least one element (7) comprises on two opposing surfaces (14, 15) a concave shape, and/or on two opposing surfaces (16, 17) a convex surface and a concave surface respectively.

9. The planet gear carrier (1) recited in claim 8, wherein said convex surface (17) is situated on a side of said at least one stiffening element (7) facing away from a center (9) of said planet gear carrier (1).

10. The planet gear carrier (1) recited in claim 1, wherein said at least one stiffening element (7) extends exactly so far along a direction of an axis of rotation (10) of a planet as said collar (3).

\* \* \* \* \*